United States Patent [19]

Carini

[11] 4,202,692

[45] May 13, 1980

[54] TUNDISH FLUX POWDER

[75] Inventor: George F. Carini, Penn Hills, Pa.

[73] Assignee: The Clay Harden Company, Pittsburgh, Pa.

[21] Appl. No.: 31,068

[22] Filed: Apr. 18, 1979

Related U.S. Application Data

[63] Continuation-in-part of Ser. No. 874,025, Feb. 1, 1978, abandoned.

[51] Int. Cl.² ............................................... C22B 9/10
[52] U.S. Cl. ........................................... 75/257; 75/53
[58] Field of Search .................................... 75/53–58, 75/257

[56] References Cited

U.S. PATENT DOCUMENTS

| | | | |
|---|---|---|---|
| 3,567,432 | 3/1971 | Wardell | 75/257 |
| 3,793,006 | 2/1974 | Kawawa | 75/257 |
| 3,993,474 | 11/1976 | Roberts | 75/257 |
| 4,060,406 | 11/1977 | Jones | 75/257 |

*Primary Examiner*—P. D. Rosenberg
*Attorney, Agent, or Firm*—Webb, Burden, Robinson & Webb

[57] ABSTRACT

This invention relates to a tundish flux for use with aluminium-killed steel consisting essentially of 31 to 75% by weight calcium carbonate, 4 to 14% alkali metal carbonate, up to 18% fluorspar, and 14 to 38% sodium fluoride. Preferably, the ingredients are finely-divided materials which are blended and agglomerated into pellets about one-quarter to one-half inch in diameter.

4 Claims, No Drawings

TUNDISH FLUX POWDER

RELATED APPLICATION

This application is a continuation-in-part of application Ser. No. 874,025, filed Feb. 1, 1978, now abandoned having the same title.

BACKGROUND

Quite a bit of work has been done in continuous casting mold fluxes as indicated by the numerous patents that have been issued pertaining thereto. See my co-pending patent application Ser. No. 874,024 entitled "Continuous Casting Mold Flux Powders" filed Feb. 1, 1978. While there is no denying the importance of the proper mold flux for successful continuous casting, the flux or slag over the molten metal in the tundish can also be very important. This is especially the case where aluminum-killed steel is being cast and the aluminum is added to the steel at the ladle prior to teeming in the tundish. This invention relates to an improved flux for tundishes, especially for use with aluminum-killed steel.

The primary purpose for using a tundish flux is to scavenge deoxidation products from aluminum-killed steel and to fluidize the viscous and refractory almunia-enriched slags which form and accumulate on the surface of steel being teemed in the tundish as successive heats are continuous cast. Additionally, a tundish flux is used to minimize or eliminate slag build up on tundish sidewalls with minimal corrosion of alumina refractories or silica sideboards. Also, during the late stages of the last heat being cast, a tundish flux is used to fluidize the accumulated slag sufficiently to assure complete draining of the tundish. At tundish operating temperatures of about 2800° F., a tundish flux must exhibit rapid fusion and spread, very high fluidity and a high alumina solubility.

One problem with introducing powders to the tundish is the tundish is often very unaccessible and may be ten feet or more below the point where the tundish flux powder can be introduced. Powder materials packed in polyethylene or paper bags will blow-out of the tundish as soon as the bag is ignited. Blow-out is caused by hot air currents rising from the tundish and results in smoking and dusting over the tundish. Also it is unfortunate that bagged material does not lend itself to automated and semi-automated feeding.

By way of comparison, it should be noted that fluxes are used in a number of processes, for example, in fluid mold casting and ingot mold casting as illustrated by U.S. Pat. Nos. 3,993,474 and 3,567,432. The powders disclosed in these patents have some compositional similarities with the tundish fluxes disclosed herein.

SUMMARY OF THE INVENTION

This invention relates to continuous casting of steel wherein the steel is ladled into a tundish from which it is teemed to a continuous casting mold. The improvement comprises providing a flux during teeming to the surface of the molten metal in the tundish consisting essentially of, in weight percent, calcium carbonate—31 to 75; alkali metal—4 to 14; fluorspar—up to 18; and sodium fluoride—14 to 38.

A preferred flux consists essentially of, in weight percent, calcium carbonate—40 to 75; alkali metal carbonate—4 to 14; fluorspar—8 to 18; and sodium fluoride—14 to 31.

An especially preferred flux consists essentially of, in weight percent, calcium carbonate—47 to 58; lithium carbonate—8 to 10; fluorspar—13 to 16; and sodium fluoride—22 to 27.

Preferably, the ingredients are finely divided materials which are well blended and thereafter pelletized into modules about one-quarter to one-half inch in diameter.

DESCRIPTION OF THE PREFERRED EMBODIMENTS

Four examples according to this invention were batched as indicated in the following table:

TABLE I

| Example | I | II | III | IV |
| --- | --- | --- | --- | --- |
| Fluorspar ($CaF_2$) | 17.4 | 14 | 10.9 | 8 |
| Sodium Fluoride (NaF) | 30.5 | 24.6 | 19.1 | 14 |
| Lithium Carbonate ($Li_2CO_3$) | 10.9 | 8.8 | 6.8 | 5 |
| Whiting ($CaCO_3$) | 41.2 | 52.6 | 63.2 | 73 |

Example II illustrates the presently preferred composition.

Example II has been found to be particularly effective in fluxing and scavenging aluminum-killed steel at the tundish. Examples III and IV are higher in lime content and therefore more viscous at steel making temperatures. Example I, on the other hand, would be less viscous.

The composition on a calcined basis of the tundish fluxes of Examples I, II, III and IV are set forth in the following table:

TABLE II

| Example | I | II | III | IV |
| --- | --- | --- | --- | --- |
| CaO | 41.7 | 49.6 | 58.4 | 67.4 |
| $F_2$ | 26.1 | 22.8 | 18.8 | 14.8 |
| $Na_2O$ | 27.1 | 23.1 | 19.0 | 14.9 |
| $Li_2O$ | 5.2 | 4.5 | 3.7 | 2.9 |

Fluxes according to this invention are especially effective if agglomerated into one-quarter to one-half inch pellets prior to application to the surface of the molten metal in the tundish. Pelletizing the tundish flux powders provides the advantage of overcoming the blow-out of tundish flux powder as it is being added to the tundish.

Having thus described my invention in detail and with the particularity required by the Patent Laws, what is desired protected by Letters Patent is set forth in the following claims.

I claim:

1. In the process of continuous casting of steel wherein the steel is teemed into a tundish from which it is poured into a continuous casting mold, the improvement comprising the step of during the teeming operation providing a tundish flux powder on the surface of the molten metal in the tundish consisting essentially of, in weight percent, Calcium Carbonate: 31 to 75
Alkali Metal Carbonate: 4 to 14
Fluorspar: up to 18
Sodium Fluoride: 14 to 38.

2. In the process of continuous casting of steel wherein the steel is teemed into a tundish from which it is poured into a continuous casting mold, the improvement comprising the step of during the teeming operation providing a tundish flux powder on the surface of the molten metal in the tundish consisting essentially of, in weight percent,
Calcium Carbonate: 40 to 75
Alkali Metal Carbonate: 5 to 11
Fluorspar: 8 to 18
Sodium Fluoride: 14 to 31.

3. In the process of continuous casting of steel wherein the steel is teemed into a tundish from which it is poured into a continuous casting mold, the improvement comprising the step of during the teeming operation providing a tundish flux powder on the surface of the molten metal in the tundish consisting essentially of, in weight percent,
Calcium Carbonate: 47 to 58
Lithium Carbonate: 8 to 10
Fluorspar: 13 to 16
Sodium Fluoride: 22 to 27.

4. The improvement according to claims 1, 2 or 3 in which the tundish flux powder is agglomerated into pellets approximately one-quarter to one-half inch in diameter.

* * * * *